United States Patent
Ruiz

(10) Patent No.: US 7,810,460 B2
(45) Date of Patent: Oct. 12, 2010

(54) ADAPTIVE INDIVIDUAL DYNAMIC VOLUMETRIC EFFICIENCY OPTIMIZATION FOR ENGINES WITH VARIABLE CAM PHASERS AND VARIABLE LIFT

(75) Inventor: Victoriano Ruiz, Roscommon, MI (US)

(73) Assignee: GM Global Technology Operations, Inc.

( * ) Notice: Subject to any disclaimer, the term of this patent is extended or adjusted under 35 U.S.C. 154(b) by 432 days.

(21) Appl. No.: 12/032,222

(22) Filed: Feb. 15, 2008

(65) Prior Publication Data
US 2009/0205599 A1 Aug. 20, 2009

(51) Int. Cl.
F01L 1/34 (2006.01)
(52) U.S. Cl. ............... 123/90.17; 123/90.15; 123/90.31
(58) Field of Classification Search ............ 123/90.15, 123/90.17, 90.31
See application file for complete search history.

(56) References Cited

U.S. PATENT DOCUMENTS 6,810,844 B2 * 11/2004 Sellnau ................... 123/90.16
6,899,093 B2    5/2005 Center

FOREIGN PATENT DOCUMENTS

| CN | 1676909 | 10/2005 |
|---|---|---|
| CN | 101182788 | 5/2008 |
| DE | 2633617 C2 | 9/1986 |
| DE | 10101848 A1 | 2/2004 |
| DE | 10349129 A1 | 5/2004 |
| DE | 102004044993 | 4/2005 |
| DE | 102007054360 | 7/2008 |

OTHER PUBLICATIONS

Office Action for German Patent Application No. 10 2008 007 480. 2-26 dated Sep. 11, 2009; 5 pages.
Robert Bosch GmbH: Abgastechnik fur Dieselmotoren. 1. Ausgabe, 2004, S. 54; 2 pages.

* cited by examiner

*Primary Examiner*—Zelalem Eshete

(57) ABSTRACT

A control system for an engine having a camshaft that is associated with an intake valve and a cam phaser that interfaces with the camshaft includes an air flow sensor that outputs first and second air flow signals based on mass air flow (MAF) delivered to the engine. An engine control module communicates with the air flow sensor and the cam phaser. The cam phaser adjusts an actuation time when the camshaft opens the intake valve during rotation of the camshaft. The control module further receives a rotational position signal based on the rotational position of the cam phaser and determines a rotational position of the cam phaser that delivers maximum air to the engine based on a first air flow signal measured prior to adjusting the cam phaser and a second air flow signal measured subsequent to adjusting the cam phaser.

17 Claims, 4 Drawing Sheets

ADAPTIVE INDIVIDUAL DYNAMIC VOLUMETRIC EFFICIENCY OPTIMIZATION FOR ENGINES WITH VARIABLE CAM PHASERS AND VARIABLE LIFT

FIELD OF THE INVENTION

The present invention relates to engine control systems, and more particularly to engine control systems for optimizing volumetric efficiency based on cylinder valve timing and air intake.

BACKGROUND OF THE INVENTION

Engines combust a mixture of air and fuel (air/fuel) to drive a piston in a cylinder. The downward force of the piston generates torque. The torque output can be increased by optimizing various factors, including volumetric efficiency of the engine. Volumetric efficiency can be defined as air flow delivered into the cylinder compared to a theoretical maximum air flow that could enter the cylinder. In theory, combusting the maximum amount of air/fuel within the cylinder delivers the largest amount of drive torque to the crankshaft.

Intake valves regulate the mass flow of air delivered to the cylinder. Exhaust valves regulate the amount of exhaust gas released into the exhaust system. The crankshaft drives camshafts that include cam lobes that mechanically actuate the valves. Valve overlap occurs when the intake valve and exhaust valve are simultaneously open. A large valve overlap can increase drive torque. By varying the level of air that enters an engine at high engine speeds, overlap forces exhaust gas out of the exhaust valve at a faster rate and allows increased amounts of fresh air to travel through the intake valve into the cylinder. At low engine speeds, large overlap may cause poor idle quality and may increase emissions.

The range of overlap can be adjusted by varying the opening and closing times of the intake valve and the exhaust valve. In fixed camshaft systems, the valve timing can be adjusted by designing cam lobe profiles that produce a desired overlap range.

In variable valve camshaft systems, the timing of valves is varied at pre-determined speeds using cam phasers that adjust the rotational position of the camshafts. Typically, a control module refers to a static reference table that includes predetermined cam phaser positions corresponding to various operating points. Traditionally, an operating point is defined as operating a vehicle at a predetermined constant speed, while simultaneously delivering a predetermined constant level air flow to the engine. As the engine operates at various operating points, the valve overlap is adjusted. Differences in manufacturing during production, geometric design and aging may hinder the ability to maximize the level of air flow into the engine.

SUMMARY OF THE INVENTION

Accordingly, the present invention provides a control system for an engine having a camshaft that is associated with an intake valve and a cam phaser that interfaces with the camshaft includes an air flow sensor that outputs first and second air flow signals based on mass air flow (MAF) delivered to the engine. An engine control module communicates with the air flow sensor and the cam phaser. The cam phaser adjusts an actuation time when the camshaft opens the intake valve during rotation of the camshaft. The control module further receives a rotational position signal based on the rotational position of the cam phaser and determines a rotational position of the cam phaser that delivers maximum air to the engine based on a first air flow signal measured prior to adjusting the cam phaser and a second air flow signal measured subsequent to adjusting the cam phaser.

In one feature, the control system further includes an air flow comparison module that compares the first air flow signal to the second air flow signal.

In another feature, a system including the control system and further including a cam phaser sensor communicates with the engine control module and measures a rotational position of the cam phaser.

In yet another feature, the engine control module periodically stores a position value based on the rotational position of the cam phaser in a storage device when the engine operates at a predetermined speed (RPM) while simultaneously ingesting a predetermined amount of air (MAF).

in still another feature, the storage device includes a reference table that is indexed by a predetermined RPM value and a predetermined MAF value.

In still another feature, the rotational position value includes a scalar offset selected from a predefined offset table indexed by a predetermined RPM value and a predetermined MAF value.

In yet another feature, the engine control module outputs a throttle signal that adjusts a position of a throttle blade associated with the throttle when the second measured air flow signal exceeds the first measured air flow signal.

In still another feature, the actuation time determines the level of MAF delivered to the engine.

In yet another feature, the first air flow signal is output when the engine intakes a constant predetermined level of MAF while simultaneously operating at a constant RPM.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
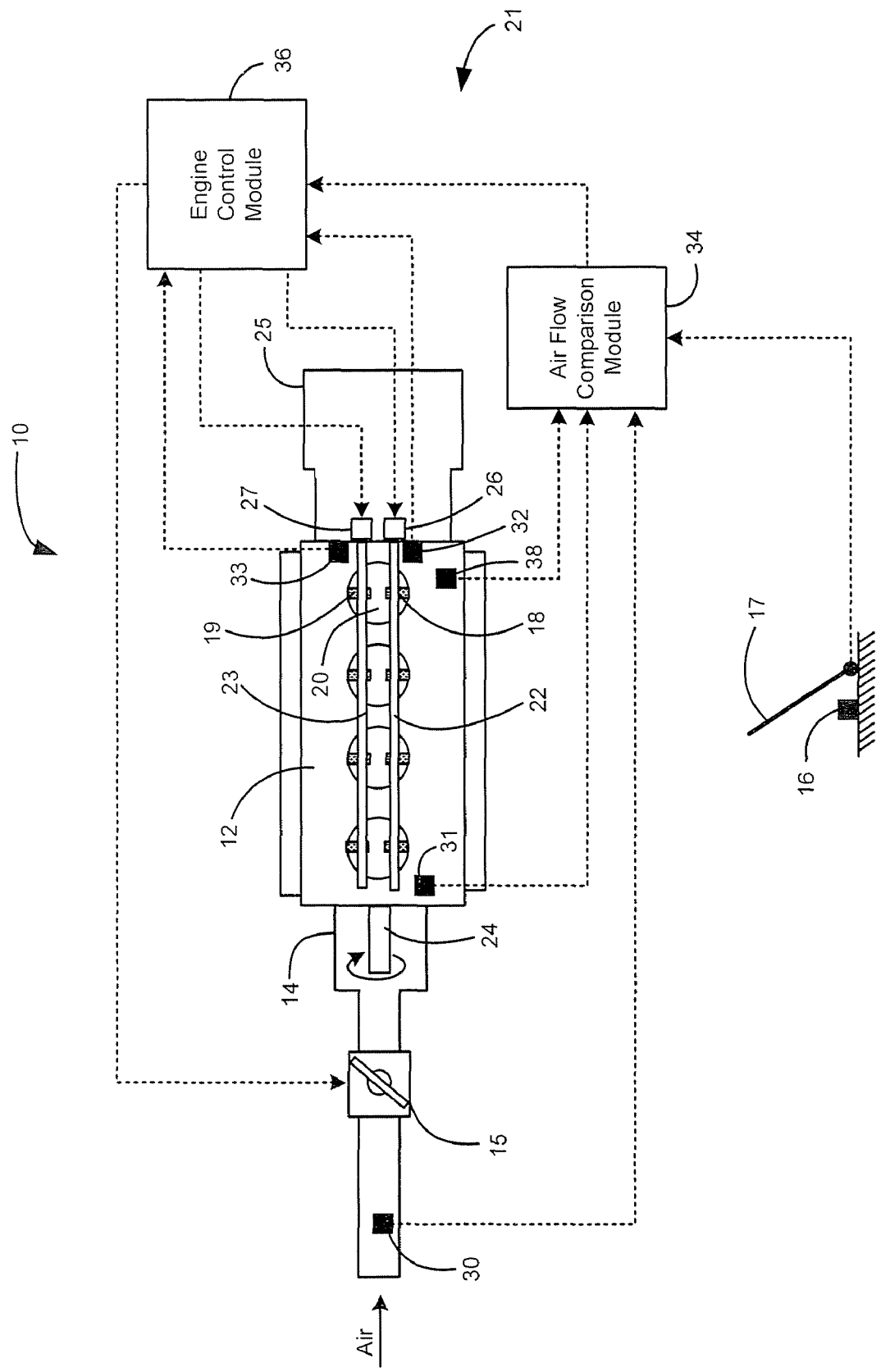
FIG. 1 is a functional block diagram of an engine system including a camshaft variable valve timing system and a control system that optimizes volumetric efficiency.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 is schematically illustrated. The engine system 10 includes an engine 12 that combusts an air and fuel (air/fuel) mixture to produce drive torque. Air is drawn into an intake manifold 14 through a throttle 15. The throttle 15 regulates mass air flow (MAF) into the intake manifold 14. The position of the throttle is adjusted based on a signal from a throttle position sensor 16 indicative of a position of a throttle control device 17. Air is delivered through an intake valve 18 into cylinders 20. Although three cylinders 20 are illustrated, it can be appreciated that a control system 21 of the present invention can be implemented in engines having a plurality of cylinders including, but not limited to, 2, 3, 4, 5, 6, 8, 10 and 12 cylinders.

A fuel injector (not shown) injects fuel which is combined with the air as it is drawn into the cylinder 20 through an intake port (not shown). The fuel injector can be an injector associated with an electronic or mechanical fuel injection system (not shown), or another system for mixing fuel with intake air. The fuel injector is controlled to provide a desired air/fuel ratio within each cylinder 20.

The intake valve 18 selectively opens and closes to enable the air/fuel mixture to enter the cylinder 20. The intake valve position is regulated by an intake camshaft 22. A piston (not shown) compresses the air/fuel mixture within the cylinder 20. A spark plug (not shown) initiates combustion of the air/fuel mixture and drives the piston in the cylinder 20. The piston drives a crankshaft 24 to produce drive torque.

The crankshaft 24 rotatably drives camshafts using a timing chain (not shown) to regulate the timing of intake and exhaust valves 18, 19. Although a single intake camshaft 22 and a single exhaust camshaft 23 are illustrated, it can be anticipated that dual intake camshafts and dual exhaust camshafts may be used.

Exhaust gas is produced inside the cylinder 20 as a result of the combustion process. The exhaust gas is forced through an exhaust port (not shown) into an exhaust manifold 25 when the exhaust valve 19 is in an open position. Although single intake and exhaust valves 18, 19 are illustrated, the engine 12 can include multiple intake valves and multiple exhaust valves 18, 19 per cylinder 20.

The intake cam phaser 26 and the exhaust cam phaser 27 vary an actuation time when cam lobes (not shown) coupled to the intake and exhaust camshafts 22, 23 mechanically actuate the intake and exhaust valves 18, 19. Specifically, the rotational position of the intake and exhaust cam phasers 26, 27 can be advanced and/or retarded to vary the actuation time. In this manner, the timing and/or lift of the intake and the exhaust valves 18, 19 can be regulated with respect to each other or with respect to a location of the piston within the cylinder 20.

The engine system 10 further includes an air flow sensor 30, an engine speed sensor 31, cam phaser rotational sensors 32, 33, an air flow comparison module 34 and an engine control module 36. The air flow sensor 30 is responsive to a level of mass air flow entering the engine 12 and outputs an air flow signal to the air flow comparison module 34. The engine speed sensor 31 is responsive to the rotation of the crankshaft 24 and outputs a speed signal to the air flow comparison module 34 indicative of the speed of the engine 12. The cam phaser rotational sensors 32, 33 are coupled to the intake cam phaser 26 and the exhaust cam phaser 27 and are responsive to rotational movement. When the intake and the exhaust cam phasers 26, 27 are rotatably adjusted, the cam phaser rotational sensors 32, 33 output a position signal to the engine control module 36 indicative of the rotational positions of the intake the exhaust cam phasers 26, 27.

The air flow comparison module 34 initiates a comparison algorithm when the engine 12 satisfies predetermined engine conditions and additionally operates at a constant predetermined operating point. An operating point is defined herein as operating a vehicle at a predetermined constant speed, while simultaneously delivering a predetermined constant level of mass air flow to the engine. The predetermined engine conditions may include, but are not limited to, engine temperature and engine running time. The air flow comparison module 34 compares a first air flow level prior to adjusting the intake cam phaser 26 and the exhaust cam phaser 27 ($AIR_{PRE}$) to a second air flow level subsequent to adjusting the intake and the exhaust cam phasers 26, 27 ($AIR_{POST}$).

The engine control module 36 communicates with the air flow comparison module 34 and advances and/or retards the rotational position of the intake and the exhaust cam phasers 26, 27 from initial positions ($\theta_{0\_INTAKE\_CAM}$, $\theta_{0\_EXHAUST\_CAM}$), as discussed further below. The adjustment regulates the opening/closing positions of the intake and the exhaust valves 18, 19 to deliver maximum air flow into the engine 12. The adjusted intake and exhaust cam phaser positions ($\theta_{INT\_REF\_N}$, $\theta_{EXH\_REF\_N}$) are stored in a two-dimensional reference table and are utilized when the engine 12 encounters similar operating points during subsequent driving scenarios. The reference table is indexed according to engine speed and mass air flow into the engine.

More specifically, the air flow comparison module 34 measures $AIR_{PRE}$ when the engine 12 operates at a predetermined operating point included in the reference table. After measuring $AIR_{PRE}$, the engine control module 36 outputs cam phaser control signals to adjust the intake and exhaust cam phasers 26, 27. The intake cam phaser 26 and the exhaust cam phaser 27 are incrementally adjusted from an initial position based on the cam phaser control signals. The engine control module 36 logs the rotational adjustment of the intake and the exhaust cam phasers 26, 27 by flagging corresponding data registers. For example, setting $REG_{INT\_ADV}$ and/or $REG_{EXH\_ADV}$ to 0 indicates that the intake cam phaser 26 and/or the exhaust cam phaser 27 have not been advanced. Conversely, setting the registers to 1 indicates that the intake and/or the exhaust cam phasers 26, 27 have been advanced.

After each incremental adjustment, the air flow comparison module 34 measures $AIR_{POST}$. Although the intake and the exhaust cam phasers 26, 27 are initially advanced, it can be anticipated that the intake and exhaust cam phasers 26, 27 can be initially retarded. If the air flow level increases (i.e. $AIR_{POST}$ exceeds $AIR_{PRE}$) beyond a predetermined threshold value, the engine control module 36 outputs a throttle position control signal that adjusts the throttle 15, and reduces the level of air flow into the engine 12. By returning the level of air flow entering the engine to $AIR_{PRE}$, the current operating point is maintained. The engine control module 36 continues incrementally adjusting the intake cam phaser 26 and the exhaust cam phaser 27 until the air flow level ceases to increase. If the air flow level into the engine 12 is not affected by initially adjusting the intake and/or the exhaust cam phasers 26, 27, the engine control module 36 assumes the cam phasers were rotated in the wrong direction. Subsequently, the engine control module 36 sets $REG_{INT\_RET}$ and/or $REG_{EXH\_RET}$ equal to 1 and adjusts the intake and/or exhaust cam phasers 26, 27 in the opposite direction.

A Cam phaser position that provides a maximum amount of air to the engine 12 is determined in two ways. First, the intake and exhaust cam phasers 26, 27 can be incrementally adjusted until the amount of air the cylinder 20 can hold is at a maximum. As a result, the level of air entering the engine 12 no longer increases when the intake and exhaust cam phasers 26, 27 are adjusted. When the air flow level fails to increase beyond a predetermined threshold, $\theta_{INT\_REF\_N}$ and $\theta_{EXH\_REF\_N}$ are stored in the reference table according to the respected operating point.

Second, the ability to advance and/or rotate the cam phasers is limited in either direction. The intake and exhaust cam phasers 26, 27 can be adjusted until a park position is reached. Once the park position has been achieved, the cam phasers can no longer be adjusted beyond that position. When a park position is reached after incrementally adjusting the intake and/or exhaust cam phasers 26, 27, the intake and exhaust cylinder valve positions have reached optimal positions and $\theta_{INT\_REF\_N}$ and/or $\theta_{EXH\_REF\_N}$ are stored in the reference table, as discussed above. By periodically refreshing the reference table with updated position values based on the rotational positions of the intake and exhaust cam phases, volumetric efficiency can be optimized.

Figure 2:
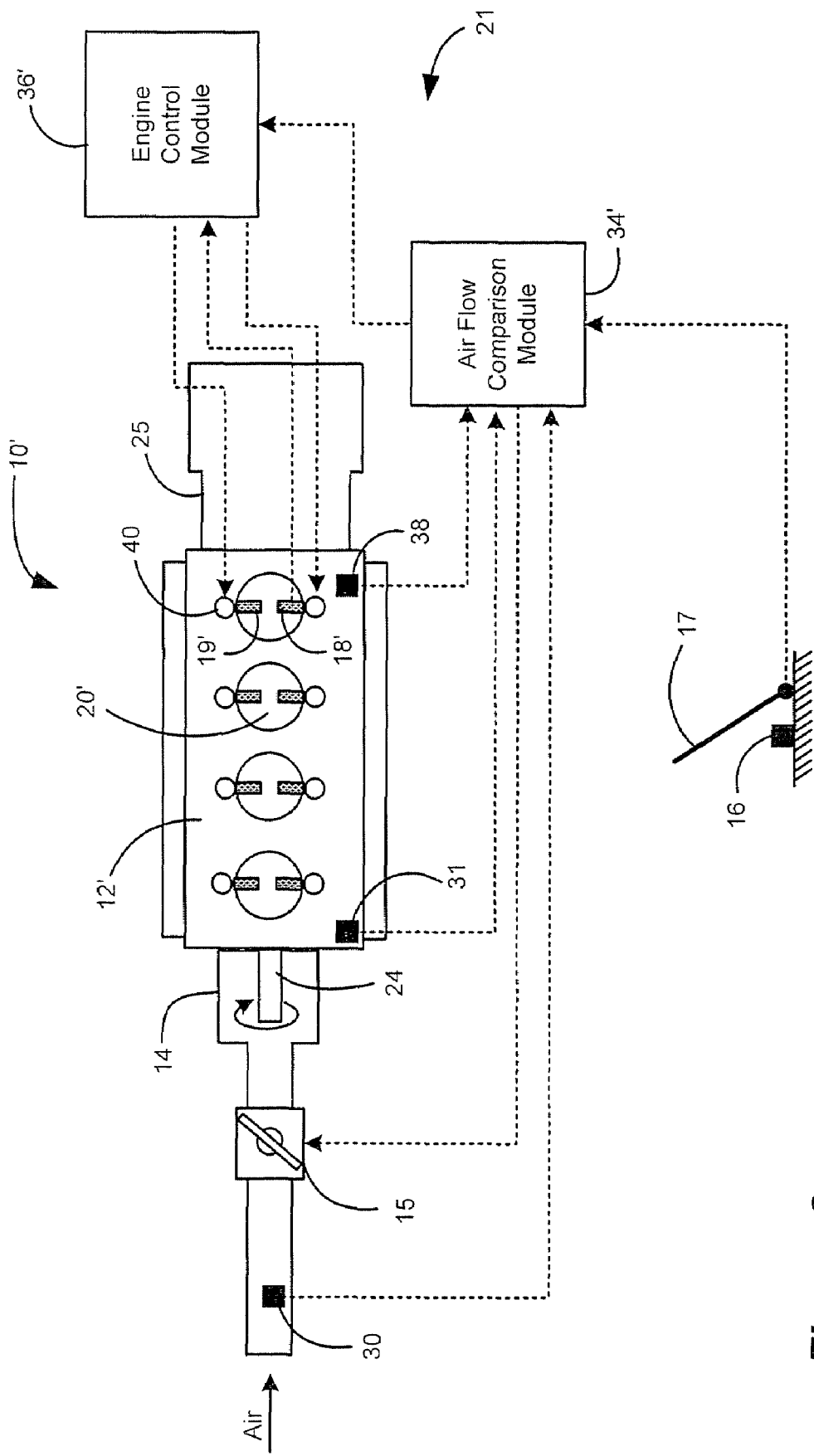
FIG. 2 is a functional block diagram of an engine system including an alternative variable valve timing system and a control system that optimizes volumetric efficiency.

Referring now to FIG. 2, an alternative engine system 10' according to the present invention is schematically illustrated. The engine system 10' is similar to the engine system 10 described above. Therefore, like reference numerals will be used to indicate like components. The intake and exhaust camshafts 22, 23 described above that control the timing of the intake and exhaust valves 18', 19' are replaced with valve actuators 40. The valve actuators 40 can use electro-hydraulic, electro-mechanical, or another method for controlling the position of the intake and exhaust valves 18', 19'. The valve actuators 40 are coupled to the intake and exhaust valves 18', 19' and communicate with the engine control module to adjust the lift position. Lift position is typically defined as the opening and/or closing positions of a cylinder valve. Valve position sensors (not shown) communicate with the engine control module 36 and measure the opening and/or closing positions of the intake and exhaust valves 18, 19.

The engine control module 36' communicates with the air flow comparison module 34' and the valve actuators 40. Based on the comparison between $AIR_{PRE}$ and $AIR_{POST}$ discussed above, the engine control module 36' generates actuator signals that control the valve actuators 40. The valve actuators 40 incrementally open and/or close the intake and the exhaust valves 18', 19' from initial positions ($ANGLE_{INT}$, $ANGLE_{EXH}$). The adjustment provides maximum air flow into the engine 12'. When lift position that provides a maximum amount of air to the engine 12 is determined, the adjusted intake and exhaust valve positions ($ANGLE_{INT\_NEW}$, $ANGLE_{EXH\_NEW}$) are stored in a two-dimensional reference table and are utilized when the engine 12' encounters similar operating points during subsequent driving scenarios. The reference table is indexed according to engine speed and mass air flow into the engine.

Figure 3A:
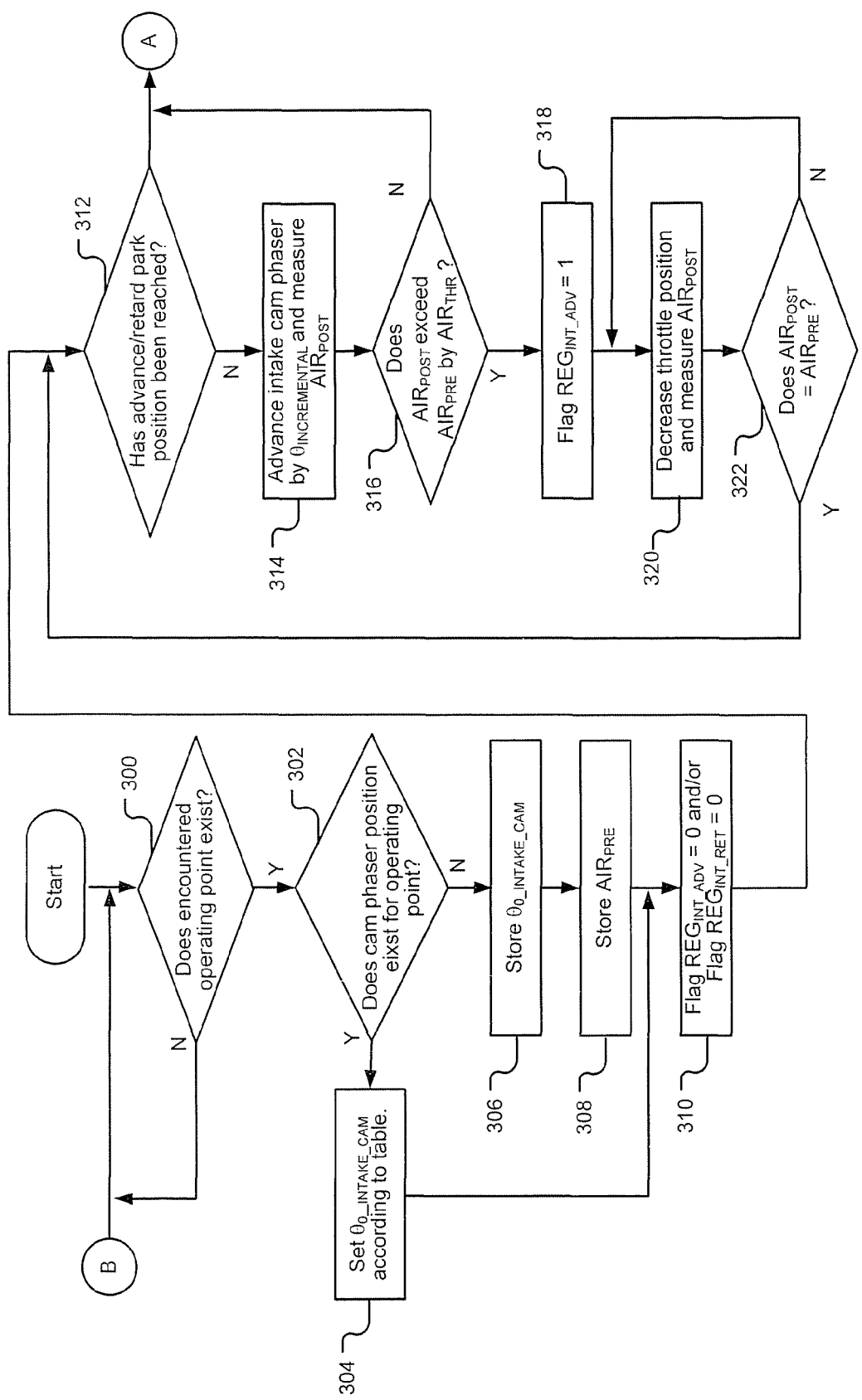
FIGS. 3A and 3B are flow charts illustrating steps executed by a camshaft control system according to the present invention.
Figure 3B:
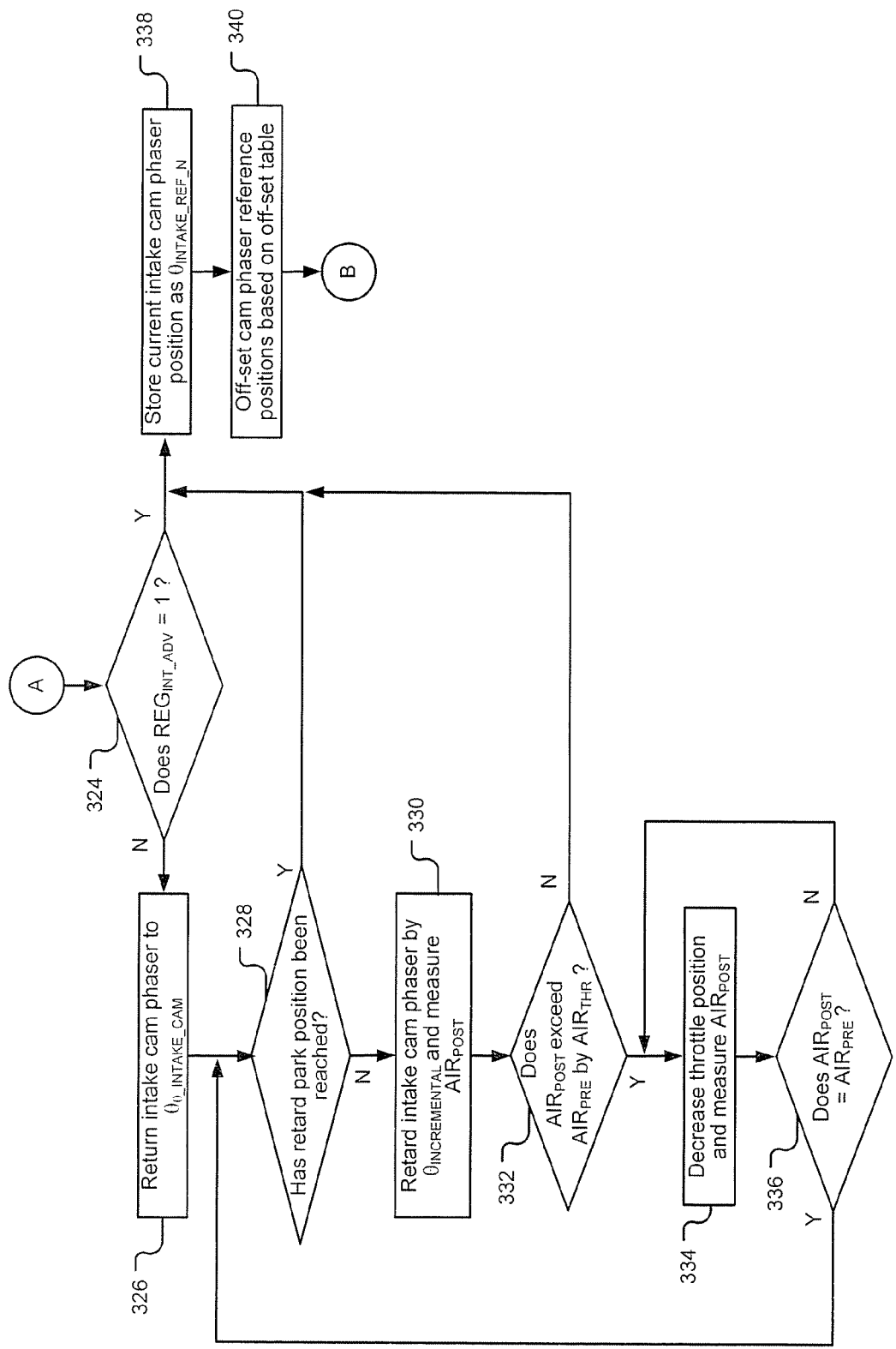

Referring now to FIGS. 3A and 3B, flowcharts illustrate the steps executed by the control system according to the present invention. Although the flowchart illustrates steps describing the adjustment of the intake cam phaser 26, it is anticipated that similar steps may be used to adjust the exhaust cam phaser 27 and the valve actuators 40.

In step 300, control determines whether an encountered operating point exists in a predetermined reference table. When the current operating point does not exist, control assumes the respected intake cam phaser position does not require optimization and control returns to step 300. When the operating point exists, control determines whether the operating point is defined in step 302. If an intake cam phaser position exists for the operating point, control adjusts the rotational position of the intake cam phaser 26 according to a predetermined reference table in step 304. After the adjustments, control proceeds to step 312. Otherwise, control begins defining the operating point by first storing the current intake cam phaser position ($\theta_{0\_INTAKE\_CAM}$) into memory in step 306. Control stores an initial air flow level ($AIR_{PRE}$) in step 308. Control clears the data registers indicating the rotational history of the intake cam phaser 26 by setting $REG_{INT\_ADV}$ and $REG_{INT\_RET}$ to zero in step 310. In step 312, control determines whether the intake cam phaser 26 has reached an advance park position. If the intake cam phaser 26 can not advance, control proceeds to step 324. Otherwise, control advances the intake cam phaser 26 by $\theta_{INCREMENTAL}$ and measures $AIR_{POST}$ in step 314. In step 316, control compares $AIR_{POST}$ to $AIR_{PRE}$. If $AIR_{POST}$ fails to exceed $AIR_{PRE}$ beyond a predetermined threshold, then control proceeds to step 324. Otherwise, control sets $REG_{INT\_ADV}$ to 1 in step 318. In step 320, control adjusts the throttle 15 to decrease the level of air flow in the engine 12, thereby maintaining the current operating point. In step 322, control determines whether $AIR_{PRE}$ equals $AIR_{POST}$. When $AIR_{PRE}$ equals $AIR_{POST}$, control returns to step 312. Otherwise, control continues adjusting the throttle 15 in step 320.

In step 324, control determines whether the intake cam phaser 26 was previously advanced by checking $REG_{INT\_ADV}$. If $REG_{INT\_ADV}$ equals 1, the intake cam phaser 26 is at an optimal position that allows maximum air flow into the engine 12 and control proceeds to step 338. Otherwise, control returns the intake cam phaser 26 to $\theta_{0\_INTAKE\_CAM}$ in step 326. In step 328, control determines whether the intake cam phaser 26 has reached a retard park position. If the intake cam phaser 26 can not retard, control proceeds to step 338. Otherwise, control retards the intake cam phaser 26 by a $\theta_{INCREMENTAL}$ and measures $AIR_{POST}$ in step 330. In step 332, control compares $AIR_{POST}$ to $AIR_{PRE}$. If $AIR_{POST}$ fails to exceed $AIR_{PRE}$ by a predetermined threshold, then control proceeds to step 338. But if $AIR_{POST}$ exceeds $AIR_{PRE}$, control adjusts the position of the throttle 15 and measures $AIR_{POST}$ in step 334. In step 336, control determines whether $AIR_{PRE}$ equals $AIR_{POST}$. When $AIR_{PRE}$ equals $AIR_{POST}$, control returns to step 328. Otherwise, control continues adjusting the throttle 15 in step 334.

In step 338, control stores $\theta_{INTAKE\_REF\_N}$ as the new optimal intake cam phaser position. The new position is referenced in subsequent driving scenarios to deliver the maximum amount of air into the engine 12 at the corresponding operating point. In step 340, control offsets $\theta_{INTAKE\_REF\_N}$ based on a predetermined offset table and control returns to step 300.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an engine having a camshaft that is associated with an intake valve and a cam phaser that interfaces with the camshaft, comprising:

an air flow sensor that outputs first and second air flow signals based on mass air flow (MAF) delivered to the engine; and an engine control module that communicates with said air flow sensor and the cam phaser, that receives a rotational position signal based on the rotational position of the cam phaser and that determines a rotational position of the cam phaser that delivers maximum air to the engine based on said first air flow signal measured prior to adjusting the cam phaser and said second air flow signal measured subsequent to adjusting the cam phaser, wherein the cam phaser adjusts an actuation time when the camshaft opens the intake valve during rotation of the camshaft.

2. The control system of claim 1 further comprising an air flow comparison module that compares said first air flow signal to said second air flow signal.

3. A system comprising the control system of claim 1 and further comprising a cam phaser sensor that communicates with said engine control module and that measures a rotational position of the cam phaser.

4. The control system of claim 1 wherein said engine control module periodically stores a rotational position value based on said rotational position in a storage device when the engine operates at a predetermined speed (RPM) while simultaneously ingesting a predetermined amount of air (MAF).

5. The control system of claim 4 wherein said storage device includes a reference table that is indexed by predetermined RPM values and predetermined MAF values.

6. The control system of claim 4 wherein said rotational position value includes a scalar offset selected from a predefined offset table indexed by said predetermined RPM values and said predetermined MAF values.

7. The control system of claim 1 wherein said engine control module outputs a throttle signal that adjusts a position of a throttle blade associated with the throttle when said second measured air flow signal exceeds said first measured air flow signal.

8. The control system of claim 1 wherein said actuation time determines a level of MAF delivered to the engine.

9. The control system of claim 1 wherein said first air flow signal is output when the engine intakes a constant predetermined level of MAF while simultaneously operating at a constant RPM.

10. A method for controlling an engine having a camshaft that is associated with an intake valve and a cam phaser that interfaces with the camshaft, comprising:

measuring first and second air flow levels into the engine;

measuring a rotational position of the cam phaser; and determining a rotational position of the cam phaser that delivers maximum air to the engine based on said first air flow level measured prior to adjusting the cam phaser and said second air flow level measured subsequent to adjusting the cam phaser, wherein the cam phaser adjusts an actuation time when the camshaft opens the intake valve during rotation of the camshaft.

11. The method of claim 10 further comprising comparing said first air flow signal to said second air flow signal.

12. The method of claim 10 further comprising periodically storing a rotational position value based on said rotational position in a storage device when the engine operates at a predetermined speed (RPM) while simultaneously ingesting a predetermined amount of air (MAF).

13. The method of claim 12 wherein said storage device includes a reference table that is indexed by predetermined RPM values and predetermined MAF values.

14. The method claim 12 wherein said rotational position value includes a scalar offset selected from a predefined offset table indexed by said predetermined RPM values and said predetermined MAF values.

15. The method of claim 10 further comprising adjusting a position of a throttle blade associated with the throttle when said second measured air flow signal exceeds said first measured air flow signal.

16. The method of claim 10 wherein said actuation time determines a level of MAF delivered to the engine.

17. The method of claim 10 further comprising measuring said first air flow level when the engine intakes a constant predetermined level of MAF while simultaneously operating at a constant RPM.

* * * * *